March 24, 1970 — E. C. HARTMAN III — 3,502,232
LOAD SIZE AND POSITION DETECTOR FOR AUTOMATIC STORAGE APPARATUS
Filed Oct. 4, 1967 — 2 Sheets-Sheet 1

INVENTOR.
ELMER CHARLES HARTMAN III
BY
ATTORNEY

# United States Patent Office 3,502,232
Patented Mar. 24, 1970

3,502,232
LOAD SIZE AND POSITION DETECTOR FOR AUTOMATIC STORAGE APPARATUS
Elmer C. Hartman III, Geneva, Ontario County, N.Y., assignor to Hartman Metal Fabricators, Inc., Waterloo, N.Y., a corporation of New York
Filed Oct. 4, 1967, Ser. No. 672,859
Int. Cl. B65g 1/04, 65/02; H01j 39/12
U.S. Cl. 214—16.4                                    2 Claims

ABSTRACT OF THE DISCLOSURE

To prevent picking up a load which is too wide or too high for a storage bin, the load carrier of an automatic storage apparatus, used for transferring loads between a loading station and the bins of a storage rack, is provided with means defining a first pair of parallel, light beams spaced horizontally from one another a distance equal to the width of the widest bin in the rack, with means defining a third, horizontally disposed light beam, which is spaced above the fork mechanism, that is used to move loads on and off the carrier, a distance equal to the height of the highest bin of the rack, and with means operative to stop the movement of said carrier, when a load carried thereby or being moved thereon interrupts one of said beams.

---

This invention relates to automatic storage apparatus, and more particularly to a safety device for preventing damage to the apparatus or to a load carried thereby during operation of the apparatus.

In conventional automatic storage apparatus, an automatically operated load-bearing carrier or stacker is movable down an aisle between a pair of spaced storage racks containing a plurality of bins or bays the open ends of which confront one another at opposite sides of the aisle. The stacker has a vertically movable elevator, which carries a retractable fork mechanism that is movable horizontally out of either side of the elevator selectively to service the racks. At the head of the aisle is a combination receiving and discharge station, where incoming loads are picked up by the stacker for deposit into one of the bins, and where outgoing loads are deposited by the stacker after removal thereby from one of the bins.

To make the most efficient use of available storage space, the aisle between each pair of confronting racks is usually just wide enough to accommodate the stacker; and the bins are made just slightly wider and higher than the loads expected to be stored therein. As a result, if an incoming load is too wide or too high to fit into a selected bin, or if a load is not properly centered on the stacker, and projects from one side or the other of the stacker, it may strike one of the racks during the movement of the stacker in the aisle, thereby causing damage to the load, the stacker, or the racks.

It is an object of this invention to provide a safety device for preventing damage to a load, or to storage apparatus of the type described, if an over-sized load is brought aboard a stacker for delivery to a storage bin.

Another object of this invention is to provide means in apparatus of the character described for avoiding damage to the load or to the racks or the stacker if a load is not properly centered on the stacker before it starts to travel down an aisle between storage racks.

A more specific object of this invention is to provide means for halting the movement of a stacker if a load thereon overhangs dangerously one side or the other of the stacker.

Other objects of the invention will be apparent hereinafter from the specification and from the recital of the appended claims, particularly when read in conjunction with the accompanying drawings.

SUMMARY OF THE INVENTION

A stacker of the type described has mounted at each side of its elevator, and in spaced relation to one another, a light source, and a photo-electric cell. If the fork mechanism has drawn a properly sized load into a correct position on the elevator, the light at each side of the elevator is directed by mirrors onto the associated photo-electric cell, permitting the drive circuit for the stacker to close to move the stacker toward the selected bin or loading station for which the load is destined. If, however, the load on the elevator is too large, or is improperly positioned, one of the beams of light will be cut off from its associated photo-electric cell by the load, and the stacker drive mechanism is automatically deenergized until the load is repositioned.

Figure 1:
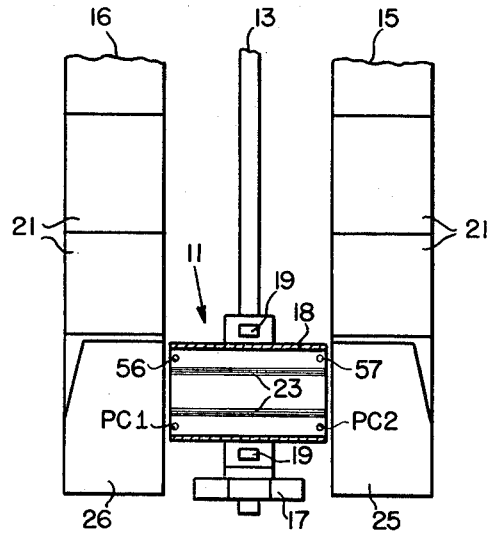
FIG. 1 is a fragmentary plan view illustrating schematically, and partially in section, an automatic stacker having a safety device made in accordance with one embodiment of this invention.
Figure 2:
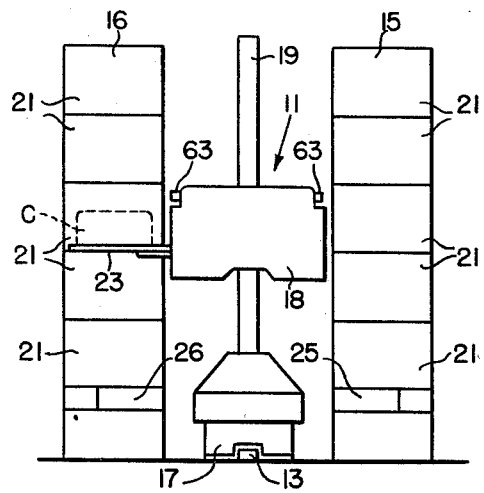
FIG. 2 is a schematic end view of this stacker and the storage racks serviced thereby.

Referring now to the drawings by numerals of reference, and first to FIGS. 1 and 2, 11 designates generally an automatic stacker, comprising a trolley portion 17, which is movable on a horizontal rail 13 between a pair of spaced storage racks 15 and 16, and an elevator portion 18, which is movable vertically on a pair of masts 19 carried by the trolley 17. Mounted on the elevator 18 at right angles to the aisle are a pair of spaced, parallel, extensible forks 23, which may be advanced out of either side of the elevator to deposit a load onto, or to retrieve a load from, one of two combination load-receiving and load-discharging stations 25 and 26, or to deposit a load C (broken lines in FIG. 2) into, or to retrieve it from, a selected bin 21 of one of the racks 15 or 16.

Figure 3:
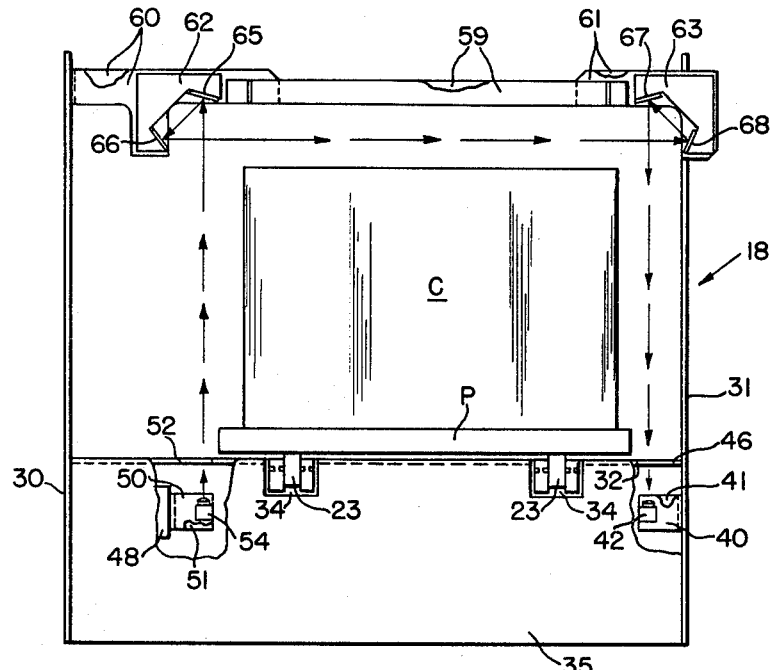
FIG. 3 is a side elevational view of the elevator portion of this stacker, with parts thereof cut away to illustrate more clearly portions of the safety device carried by the elevator.
Figure 4:
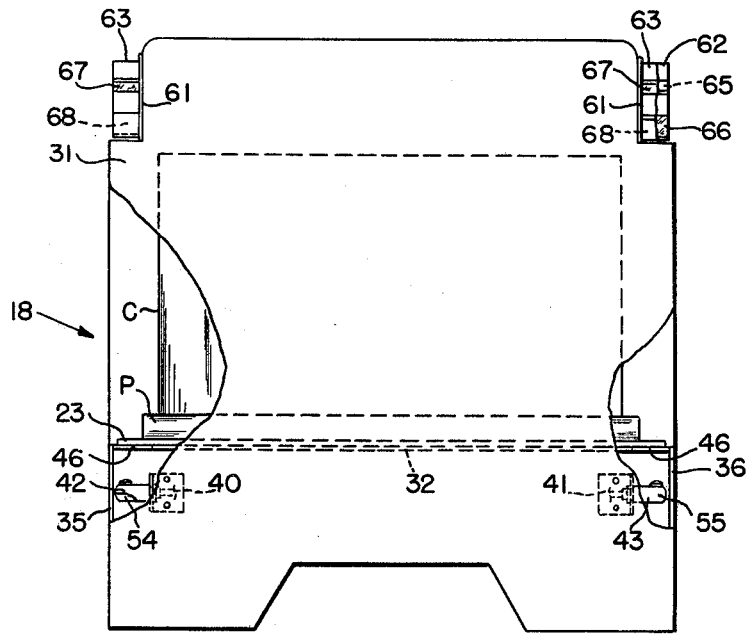
FIG. 4 is an end view of the elevator.

Referring now to FIGS. 3 and 4, the elevator 18 comprises a pair of spaced, parallel end plates 30 and 31, and a horizontal floor plate 32, which is secured to and extends between the plates 30 and 31 above the lower edges thereof. The extensible and retractable forks 23 have coplanar, horizontal upper surfaces, which are spaced slightly above plate 32. Opposite ends of the forks 23 register with notches or recesses 34, which are formed in the upper edges of a pair of side plates 35 and 36, that extend downwardly from opposite sides of floor plate 32 transverse to the plates 30 and 31. Together with the end plates 30 and 31, these side plates 35 and 36 form beneath plate 32 a housing containing mechanism (not illustrated) for reciprocating the forks 23 selectively out of opposite sides of the elevator 18, and through the registering recesses 34. Since a detailed description of this apparatus is not necessary to an understanding of the present invention, it has not been illustrated here in detail.

Secured to, and projecting at right angles from the inside face of plate 31 beneath the floor plate 32 adjacent opposite sides of the elevator are two, spaced, horizontally registering brackets 40 and 41 (FIG. 4). Mounted on the brackets 40 and 41 are housings 42 and 43, respectively, which contain photo-electric cells PC1 and PC2 (FIGS. 1 and 5), respectively. Apertures are provided in the housings 42 and 43, which admit light to the photo-electric cells therein. These apertures face upwardly and register with openings 46 in the floor plate 32 at opposite sides of the elevator.

Mounted on a bar 48, which is fixed to the inside face of plate 30 beneath the floor plate 32, are two further, spaced, horizontally registering brackets 50 and 51. These brackets are aligned, respectively, with the brackets 40 and 41, the brackets 50 and 51 being mounted on end plate 30 at one end of the elevator, and the brackets 40 and 41 being mounted on end plate 31 at the other end of the elevator. Mounted on brackets 50 and 51 to register with openings 52 (only one of which is illustrated in FIG. 3) that are formed in floor plate 32 at opposite sides of the elevator are two lamp housings 54 and 55, respectively. The housings 54 and 55 contain lamps 56 and 57, respectively.

Secured to brackets 60, which are mounted at opposite upper corners of the plate 30, are two mirror housings 62. Similarly secured at opposite upper corners of end plate 31 are two brackets 61 on which are mounted two mirror housings 63 (FIG. 4). The confronting ends of the two brackets 60 and 61 at each side of the elevator are connected to opposite ends of a strut 59.

Mounted in each housing 62 are two spaced mirrors 65 and 66. Two further mirrors 67 and 68 are mounted in each mirror housing 63. Each mirror 65 registers vertically with one of the lamps 56 and 57; and each mirror 67 registers vertically with one of the photo-electric cells PC1 and PC2. In each housing 62 the mirrors 65 and 66 are inclined to one another, as are the mirrors 67 and 68 in each of the housings 63. At each side of the elevator 18 the housing 62 registers horizontally with the housing 63 at the same side of the elevator.

Figure 5:
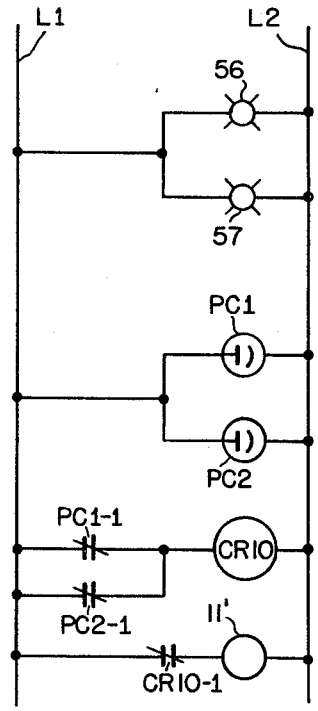
FIG. 5 is a wiring diagram illustrating one manner in which a safety device made in accordance with this invention may be incorporated in the control circuit of the stacker.

Referring now to FIG. 5, lines L1 and L2 represent part of a control circuit supplying power to means for operating the stacker 11. An AC power supply is adapted to be connected across lines L1 and L2 by conventional means (not illustrated). The lamps 56 and 57, and the photo-electric cells PC1 and PC2 are connected in parallel across the lines L1 and L2. The cells PC1 and PC2 control normally-closed switches PC1-1 and PC2-1, respectively. These switches are connected in parallel with one another, and in series with a control relay CR10 across the lines L1 and L2. When energized, relay CR10 opens switch CR10-1 and opens the circuit to stacker drive 11' to stop all motion of the stacker and its transfer mechanism 23. When the cells PC1 and PC2 are energized by light from the lamps 56 and 57, the switches PC1-1 and PC2-1 are held open.

Whenever power is applied to the stacker control circuit, the lamps 56 and 57 and the photoelectric cells PC1 and PC2 are energized. At one side of the elevator, therefore, a beam of light from the lamp 56 in housing 54 is directed, as indicated by the arrows in FIG. 3, vertically upwardly onto mirror 65, then diagonally downwardly onto adjacent mirror 66, then horizontally across the elevator to mirror 68, then diagonally upwardly to the adjacent mirror 67, and then vertically downwardly the elevator, then diagonally downwardly onto the adjaonto the photo-electric cell PC1 in the housing 42. Also, at the opposite side of the elevator a beam of light is similarly directed from the lamp 57 in the housing 55 vertically upwardly onto the mirror 65 at that side of cent mirror 66, then horizontally across the elevator onto the registering mirror 68, then diagonally upwardly to the adjacent mirror 67, and then downwardly onto the photoelectric cell PC2 in the housing 43. With the photo cells PC1 and PC2 energized by the beams of light from the lamps 56 and 57, the associated switches PC1-1 and PC2-1 are moved from their normally closed to their open positions, thereby preventing energization of the relay CR10.

The lamps 56 and 57 are spaced from their associated photo-electric cells PC1 and PC2 a distance equal to approximately the width of the opening or entrance to the widest bay 21 in the racks 15 and 16. Moreover, the mirror housings 62 and 63 are positioned so that the beam of light (horizontally disposed arrows in FIG. 3), which is projected or reflected from a mirror 66 horizontally across the elevator to the registering mirror 68, is vertically spaced above the floor plate 32 of the elevator a distance approximately equal to the height of the entrance to the tallest bin 21 in the racks 15 and 16. As a result, the entrance to each side of the elevator 18, or the zone through which a load must pass during the transfer thereof on or off the elevator by the forks 23, is framed or bordered by beams of light (arrows in FIG. 3) corresponding to the sides and the top of the widest and tallest, respectively, of the bins 21 in the adjacent rack 15 or 16. Consequently, if during the transfer of a pallet P (FIGS. 3 and 4) and its load C by the forks 23 from one of the stations 25 or 26 onto the elevator 18, either the pallet or the load is improperly positioned—e.g., either the pallet or its load C is positioned too far to the left or right of the midpoint of the space between the two fork members 23, so that one side of the pallet or its load blocks off one of the vertically disposed beams of light extending from the lamp 56 or 57 to its registering mirror 65, the resultant blocking off of light from the photocell PC1 or PC2 will cause one of the switches PC1-1 or PC2-1 to return to its normally closed position, thereby energizing the reject relay CR10. This instantly opens switch CR10-1 removing all power from the stacker 11, stopping the motion of the forks 23 until the load C and/or its pallet P has or have been adjusted on the forks 23 so as no longer to interfere with light from the lamps 56 and 57 during the retraction of the forks 23.

In a similar manner, if the load C, which is being brought abroad the elevator from one of the stations 25 or 26, is too high to fit into one of the bins 21, the top of the load C will block off one of the horizontally disposed beams of light from a mirror 66 during the movement of the load abroad the elevator; and if the load is too wide, one side or the other of the load will interrupt one of the vertically disposed beams of light. This will again energize the reject relay CR10, as above, and will cause the stacker 11 to be shut down until the load C is replaced or restacked to avoid interference with the light beams from the lamps 56 and 57.

If after being brought aboard the stacker from one of the stations 25 or 26, or from one of the bins 21, either the pallet P or its load C should project beyond one side or the other of the stacker, the projecting portion of the pallet or load may strike one of the storage racks during the movement of the stacker down the side between the racks. This will cause either the pallet or load to be shifted sidewise on the supporting fork mechanism 23, and into the path of one of the four vertically disposed beams of light created on the elevator by the lamps 56 and 57 and their associated mirrors. This immediately causes one of the switches PC1-1 or PC2-1 to close, thereby energizing the relay CR10 so that the stacker 11 is stopped before any serious damage can occur to the misplaced pallet or load, and to the rack struck thereby.

From the foregoing it will be apparent that the load sizing or safety device disclosed herein provides a relatively simple and reliable means for detecting the presence of an over-sized load, or an improperly positioned load or pallet during the transfer thereof from one of the stations 25 or 26 onto the elevator. If the load is too large to fit into any bin in one of the racks 25 or 26, the detector operates to prevent the load from being brought aboard the stacker. Moreover the detector works equally as well to prevent damage to a load or rack upon the transfer of an improperly positioned load from one of the bins 21 in either rack 15 or 16 onto the elevator for delivery by the stacker to another bin, or to one of the stations 25 or 26. Since there are no mechanical feelers or probes utilized for detecting the actual position of the pallet P and its load C during the movement thereof onto the elevator, there are substantially no mechanically moving parts of the detector which may become damaged or otherwise placed in need of repair after long periods of use.

In the embodiment illustrated, the width and height of the entrance at the open end of a bin 21 is equivalent to the width and height, respectively, of the bin itself. Moreover, it will be understood that in practice relay CR10 may operate a plurality of switches to effect the halt of the forks 23 and to prevent further movement of the stacker; and that in the illustrated embodiment the drive 11' is merely representative of the stacker drive mechanism.

Having thus described my invention, what I claim is:

1. In automatic storage apparatus for transferring a load to and from a storage rack which has at least one bin, and comprising
 a load carrier for moving loads between said bin and a loading station adjacent said rack, and movable transfer means on said carrier selectively operable to transfer a load from said bin onto said carrier, and vice versa, when said carrier registers with said bin, and to transfer a load from said station onto said carrier and vice versa, when said carrier registers with said station, the improvement comprising
  detector means on said carrier defining a plurality of spaced boundaries bordering a zone through which a load is to be moved during the transfer thereof on or off said carrier by said transfer means, and
 means for automatically stopping any movement of said carrier and said transfer means, when any portion of the last-named load intersects any of said boundaries, said detector means comprising
  a light source mounted on said carrier to direct a beam of light along a first vertical path, which defines one of said boundaries,
  a photo-electric cell on said carrier and spaced from said light source, and
  reflective means spaced from both said source and said cell and registering therewith to direct said beam of light onto said cell along a second vertical path which defines another of said boundaries, and which is disposed in spaced, parallel relation to said first path, and
  means operative, when said beam of light is blocked off from said cell, to effect operation of said stopping means,
 said first and second vertical paths being spaced from one another a distance approximately equal to the width of said bin, said reflective means comprises a first mirror mounted on said carrier above and in registry with said source, for receiving the beam of light from said source, a second mirror mounted on said carrier and inclined to said first mirror for directing said beam horizontally across and above said transfer means, and a third mirror mounted on said carrier in alignment with said second mirror for receiving the horizontal beam of light from said second mirror, and a fourth mirror mounted on said carrier above and in registry with said cell and inclined to said third mirror to direct the beam vertically downwardly onto said photoelectric cell.

2. Automatic storage apparatus as defined in claim 1, for transferring loads to and from a rack containing a plurality of bins, wherein
 said light source and cell are spaced horizontally from one another a distance equal approximately to the width of the widest bin in said rack, and
 said mirrors are positioned so that said horizontally directed beam of light is spaced above said transfer means a distance equal approximately to the height of the tallest bin in said rack.

References Cited

UNITED STATES PATENTS

| | | | |
|---|---|---|---|
| 2,366,152 | 12/1944 | Lauterbach | 250—222 |
| 3,219,207 | 11/1965 | Chaser. | |
| 3,323,661 | 6/1967 | Chaser. | |
| 3,335,285 | 8/1967 | Gally et al. | 250—221 |
| 3,387,724 | 6/1968 | Armington. | |

FOREIGN PATENTS

| | | |
|---|---|---|
| 1,170,286 | 5/1964 | Germany. |

GERALD M. FORLENZA, Primary Examiner

R. B. JOHNSON, Assistant Examiner

U.S. Cl. X.R.

250—223